United States Patent [19]

Fellinger

[11] Patent Number: 5,270,820
[45] Date of Patent: Dec. 14, 1993

[54] METHOD AND APPARATUS FOR TRACKING A POINTING DEVICE IN A VIDEO FIELD

[75] Inventor: David Fellinger, Westlake Village, Calif.

[73] Assignee: Ultimatte Corporation, Chatsworth, Calif.

[21] Appl. No.: 904,203

[22] Filed: Jun. 25, 1992

[51] Int. Cl.$^5$ .............................................. H04N 5/262
[52] U.S. Cl. .................................... 358/183; 358/125; 358/22
[58] Field of Search .................... 358/183, 22 CK, 125, 358/126, 160, 222, 93; 340/709

[56] References Cited

U.S. PATENT DOCUMENTS 4,409,618 10/1983 Inaba et al. .......................... 358/183
4,631,583 12/1986 Paul ...................................... 358/125

*Primary Examiner*—Victor R. Kostak
*Attorney, Agent, or Firm*—Blakely, Sokoloff, Taylor & Zafman

[57] ABSTRACT

A system which allows the weather television personalities to move and place computer generated symbols onto a weather map background image using only his hand or finger as a pointing device. The weather forecaster is generally in front of a blue screen and must make it appear that he can actually see the weather map behind himself. In the video frame, which is raster scanned, the hand pointing to the object to be moved or placed translates to the first object in the raster (on the left) or the last object in the raster (on the right). The present invention is a method and apparatus which identifies the rightmost or leftmost point in the raster and communicates this information to a graphics computer as x-y coordinate data. The data is utilized by the computer to place a movable graphic symbol at the weather forecaster's fingertip allowing him to move and place the symbol.

2 Claims, 3 Drawing Sheets

METHOD AND APPARATUS FOR TRACKING A POINTING DEVICE IN A VIDEO FIELD

SUMMARY OF THE INVENTION

On air weather forecasters utilize matting devices to cause themselves to appear to the viewing audience to be in front of weather maps, although the maps are actually a background video signal generated by a weather computer or other source. They then refer to details in these maps with open handed gestures to highlight weather patterns. Presently, these weather patterns may move during the course of the weathercast by preprogrammed sequences. It would be useful to move weather symbols such as clouds, sun, weather fronts, etc. with these gestures rather by a preprogrammed sequence. The current invention allows the weather forecaster to move and place computer generated symbols onto the weather map using only his hand or finger as a pointing device.

The weather forecaster is generally in front of a blue screen and must make it appear that he can actually see the weather map behind himself. This is accomplished by turning in profile to the camera and observing himself in talent monitors which are placed to the right or left of the set. He can then observe himself and can place his hand in specific positions on the map based upon his visual feedback from the talent monitors. Consider the case in which he faces to his right which is the left side of the picture as viewed by the camera. As he gestures, his hand will be the object which is furthest to the left in the video frame. If he turns to his left and gestures, his hand will be the furthest object to the right in the video frame. In the video frame, which is raster scanned, this translates to the first object in the raster (on the left) or the last object in the raster (on the right). The present invention is a method and apparatus which identifies the rightmost or leftmost point in the raster and communicates this information to a graphics computer as x-y coordinate data, the x data representing the position on a scan line from 0 to about 760 depending on the blanking width and the y data representing a scan line from 0 to 253 with a field identifier pulse indicating an even field or an odd field (for an NTSC signal). The data is utilized by the computer to place a movable graphic symbol at the weather forecaster's fingertip allowing him to move and place the symbol.

DETAILED DESCRIPTION OF THE INVENTION

Figure 1:
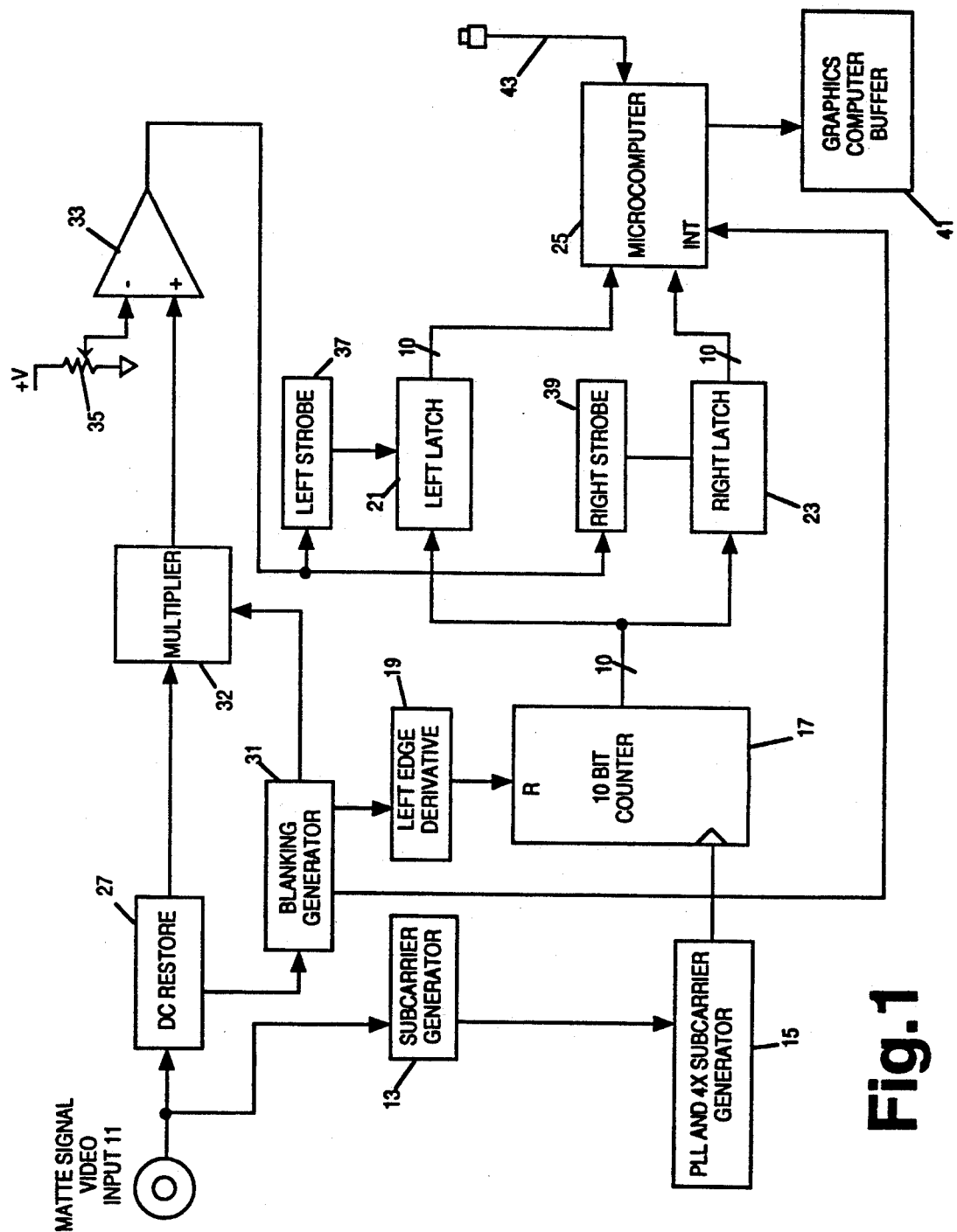
FIG. 1 is block diagram showing the elements of the invented system.

The only video input to this system is the matte output 11 of the matting device which is creating the composite image of the weather forecaster superimposed on the weather map. This matte signal on a blue screen is blue minus red or green whichever is higher. It is fully described in U.S. Pat. No. 4,100,569. This signal is normalized to normal video levels and sync and burst are added by the compositing device. Viewed on a monitor the signal would appear to be a white raster with the weather forecaster appearing as a black silhouette. Shadows and transparencies appear to be various shades of gray in this signal. A subcarrier oscillator signal created by subcarrier generator 13 is locked to the color burst of the incoming matte signal 11. The oscillator output is input to PLL and 4X subcarrier generator 15 which is a phase locked loop and divider such that the final output of subcarrier generator 15 is a four times subcarrier clock. This clock drives a ten bit counter 17 which is cleared to zero by a differentiated blanking edge produced by left edge derivative circuit 19 which identifies the left side of the raster. The output of the counter is buffered by two latches 21 and 23 which are connected to input ports of a microcomputer 25. The latches are called the left latch and the right latch for purposes of this discussion. The matte signal is DC restored by DC restore 27 and blanked by blanking generator 31 and connected through multiplier 32 to a comparator 33 set by potentiometer 35 to a comparison level of about 10 units of video.

The only meaningful portion of the matte signal for the purposes of this invention are the very low levels of signal where the level of the signal is a certain indication of the opacity of the subject at that point. The comparator is connected to strobe circuits 37 and 39 which strobe the latches. The left latch 37 is strobed when the matte signal first changes from white to black. This point indicates the leftmost point of the subject on a given video line. The strobe is operated by an RS flip-flop and is only reset at the beginning of the next video line. The right latch 39 is strobed by a buffered signal directly related to the output of the comparator. That is, the right latch is latched when the matte signal is white or when the end of the raster is reached.

If, for example, the subject is standing with his arm pointing downward to his left. The main part of his body will be in silhouette and at the edge of his chest the matte signal will be white. This does not represent the rightmost edge of the subject, however, because the scan has not yet reached his arm. When his arm is reached the strobe is cleared and the latch 23 is again latched a second time at the edge of his arm which represents the true rightmost edge of the raster. A differentiated blanking edge generated by blanking generator 31 represents the rightmost edge of the raster and is used to interrupt the microcomputer. When the microcomputer is interrupted, i.e., at the end of each scan line, it loads the contents of the latches 21 and 23 during the horizontal blanking interval of 11.1 microseconds. This must be done during the blanking interval since the data will not be available after the start of the new line.

The microcomputer then increments an internal line counter and does two comparisons as follows. The left latch output is compared with the previous lowest value of this latch for this field. If the current value is lower it becomes the new value including the line count. The right latch output is compared with the highest value of this latch for this field and replaces the old value if the current value is higher. Again, this value is stored including the line count.

One other value is stored and that is the right latch minus the left latch shifted one place to the right (divided by two) and added to the left latch. This value represents the centerline (x-coordinate) of the figure of the subject. This is stored as an eight line average and the previous average is discarded when an additional eight lines are read. This average is continued to the bottom of the raster or until the first line of video without an edge which would indicate a scan below the subject's feet. The resultant stored number represents the center line of the subject's legs. These calculations must be completed on a line by line basis and must be done within the 63.5 microsecond time frame which represents one video line.

At the bottom of the raster there are five meaningful values available:
1. The x and y value of the leftmost point of the subject.
2. The x and y value of the rightmost point of the subject.
3. The x value of the centerline of the subject's legs.

During the vertical interval the microcomputer is interrupted by the vertical blanking signal from blanking generator 31 to begin the final processing of the data. The centerline x value minus the leftmost latch x value is calculated. The rightmost latch x value minus the centerline value is calculated. If the left differential value is higher it is presumed that the subject is pointing to his right. If the right differential value is higher it is presumed that the subject is pointing to his left. The relevant x and y coordinates of his pointing hand are transmitted to the graphics computer buffer 41 during this vertical interval and the process continues into the next field. If the pointing hand moves between video fields, then a different x and/or y coordinate is transmitted to the graphics computer buffer.

In practice, the weather forecaster holds a small RF transmitter, which is part of a RF transmitter/receiver system, in the hand opposite his pointing hand. He would then point with one hand and depress a button with his other hand indicating that he wished to facilitate a tracking sequence. The button data is input on a microcomputer port input coupled to an appropriate RF receiver and during a tracking time the code to determine the left or right side is disabled. This makes a wider range of gesturing and pointing possible allowing for an opposite side elbow or balancing leg extension.

Implementations of the specific circuit elements and programming of microcomputer 25 should be apparent to persons skilled in the field of the invention based on the foregoing description, but the following additional details are provided for further clarification.

Subcarrier generator 13 may be implemented by a Harris CA3126 subcarrier regenerator integrated circuit.

PLL and 4X subcarrier generator 15 may be implemented with a 74HC4046 integrated phase locked loop and a 74HC161 counter as a device providing a divide by 4 function.

10 bit counter 17 may be implemented with three 74HC161 counters.

Left edge derivative circuit 19 may be implemented with a series capacitor followed by a resistor to ground coupled to a 74HC14 Schmidt trigger Latches 21 and 23 may be each implemented using a 74HC573 8-bit transparent latch.

Microcomputer 25 may be implemented using a MC68HC000P12 microcomputer available from Motorola.

DC restore circuit 27 may be implemented by capacitively coupling the input video signal to a transistor which is saturated to ground by a clamp pulse in the back porch region following the burst portion of the signal and preceding the video portion of the signal.

Blanking generator 31 may be implemented by a single shot 74HC221 for horizontal blanking timed from the rising edge of the input sync signal NOR gate coupled with gated counts from a CD4040 counter which counts lines to derive vertical blanking.

Multiplier 32 may be implemented using a Motorola 1495 multiplier followed by a Harris 2525 operational amplifier configured as a level shifter.

Comparator 33 may be implemented as part number LM319N available from National or Signetics.

Potentiometer 35 is a 10K linear potentiometer.

Graphics computer buffer 41 may be implemented using a 74HC573 configured to provide the computer with parallel access to 8 bits of data.

RF transmitter/receiver system 43 may be implemented by any commercially available RF system such as one utilizing a Holtek HT-12e encoder for the transmitter and HT-12d decoder for the receiver.

Figure 2:
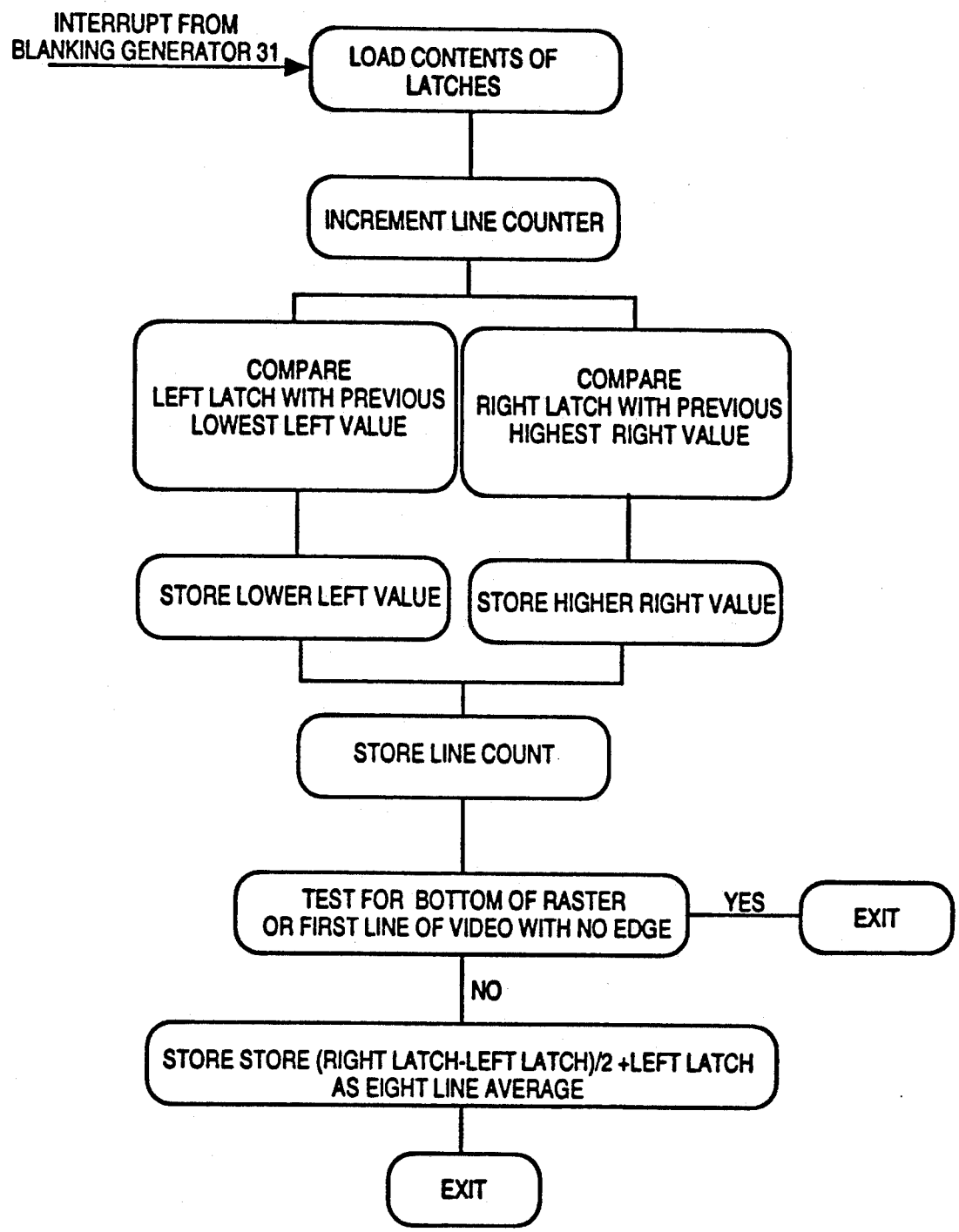
FIG. 2 is a flowchart of a computer program which may be used to perform the comparisons needed by the present invention.

FIG. 2 is a flowchart of a computer program which may be used to perform the comparisons needed to determine the location of the left or right position of the lowest left value and highest right value within a video frame and store such values and to determine the center line of the subject's legs as described above.

Figure 3:
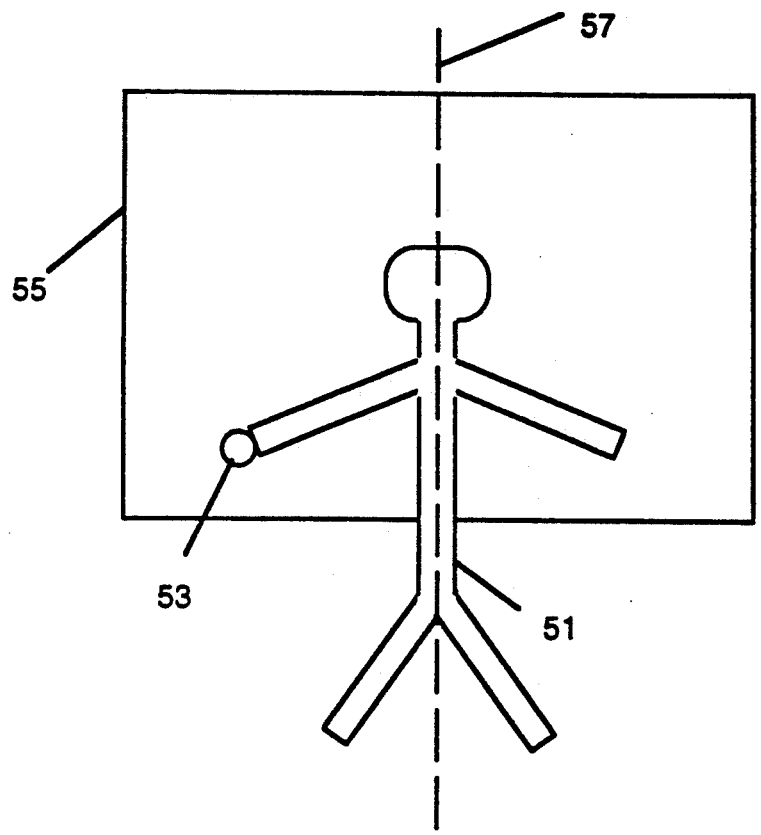
FIG. 3 is a block diagram showing a foreground subject with a pointing device capable of being tracked by the invented method and apparatus.

FIG. 5 is a view showing a foreground subject 51 with a pointing device 53, which may be his hand or a pointer held in his hand, in front of a box 55 representing a background such as a weather map. FIG. 3 also shows the positioning of a centerline 57 which is used by the invention to determine the position of the pointing device 53 as described above. Of course, the centerline does not actually appear in any display.

I claim:
1. In a sequence of video fields having a foreground component and a background component, a system for tracking a pointing device in use by a foreground subject which device is the leftmost or rightmost object within the foreground component comprising:
   a) means for determining for each video field a pixel value and scan line representing the leftmost position of the foreground subject and pointing device for that video field and a pixel value and scan line representing the rightmost position of the foreground subject and pointing device for that video field;
   b) means for determining the centerline of the foreground subject for each video field;
   c) means using the centerline for determining whether the pointing device is on the right side of the video field or the left side of the video field;
   d) means for storing the position of the pointing device after receipt of a signal generated by the foreground subject.

2. In a sequence of video fields having a foreground component and a background component, a method for tracking a pointing device in use by a foreground subject which device is the leftmost or rightmost object within the foreground component comprising the steps of:
   a) determining for each video field a pixel value and scan line representing the leftmost position of the foreground subject and pointing device for that video field and a pixel value and scan line representing the rightmost position of the foreground subject and pointing device for that video field;
   b) determining the centerline of the foreground subject for each video field;
   c) using the centerline for determining whether the point device is on the right side of the video field or the left side of the video field; and
   d) storing the position of the pointing device after receipt of a signal generated by the foreground subject.

* * * * *